United States Patent
Endres

(10) Patent No.: US 6,410,622 B1
(45) Date of Patent: Jun. 25, 2002

(54) METHOD OF PREVENTING FOULING ORGANISMS IN MARINE ENVIRONMENTS AND POLYMER-BOUND NITRIC OXIDE/NITRIC OXIDE-RELEASING COMPOSITIONS USABLE THEREFOR

(76) Inventor: Gregory W. Endres, 1137 Cutler Cir., Saline, MI (US) 48176

( * ) Notice: Subject to any disclaimer, the term of this patent is extended or adjusted under 35 U.S.C. 154(b) by 0 days.

(21) Appl. No.: 09/658,964

(22) Filed: Sep. 11, 2000

(51) Int. Cl.[7] ................................................ C08K 5/22
(52) U.S. Cl. .................... 524/189; 523/122; 525/360; 525/376; 525/420; 525/437; 525/453; 525/454; 527/312
(58) Field of Search .................... 524/189; 523/122; 527/312; 525/360, 376, 437, 453, 420, 459

(56) References Cited

U.S. PATENT DOCUMENTS

| | | | |
|---|---|---|---|
| 5,603,755 A | | 2/1997 | Okada et al. |
| 5,637,745 A | | 6/1997 | Silverman et al. |
| 5,698,738 A | | 12/1997 | Garfield et al. |
| 5,714,511 A | * | 2/1998 | Saavedra et al. ............ 514/428 |
| 5,718,892 A | | 2/1998 | Keefer et al. |
| 5,770,645 A | * | 6/1998 | Stamler et al. ............. 524/419 |
| 5,962,520 A | * | 10/1999 | Smith et al. ................ 514/529 |
| 5,994,444 A | * | 11/1999 | Trescony et al. ........... 524/429 |
| 6,057,367 A | * | 5/2000 | Stamler et al. ............. 514/561 |
| 6,200,558 B1 | * | 3/2001 | Saavedra et al. ........... 514/611 |
| 6,232,336 B1 | * | 5/2001 | Hrable et al. ............... 514/402 |

OTHER PUBLICATIONS

Nitric oxide synthase activity in molluscan hemocytes; Angela Conte, Enzo Ottaviani; Department of Animal Biology, via Beregnario 14, University of Modena, 41100 Modena, Italy; Received Mar. 14, 1995; revised version received Apr. 13, 1995; FEBS Letters 365 (1995) 120–124.
Defense mechanisms and diseases prevention in farmed marine invertebrates; Philippe Roch; Defense of Resistance chez les Invertebres Marins (DRIM²), Universite de Montpellier 2, cc 80, Place Eugene Bataillon, F–34095 Montpellier Cedex 5, France; Received Oct. 25, 1998; accepted Oct. 30, 1998; Aquaculture 172 (1999) 125–145.
Evidence for nitric oxide production and utilization as a bacteriocidal agent by invertebrate immunocytes; Enzo Ottaviani, Liesbet R. Paemen, Patrick Cadet and George B. Stefano; Department of Animal Biology University of Modena, Via Berengario 14, 41100 Modena, Italy, and Old Westbury Neuroscience Research Institute, Station University of New York/Old Westbury, NY USA; European Journal of Pharmacology–Environmental Toxicology and Pharmacology Section, 248 (1993) 319–324.
Monitoring for Zebra Mussel Infestation; Library of Congress Cataloging–in–Publication Data; Claudi, Renata; Practical manual for zebra mussel monitoring and control/ Renata Claudi and Gerald L. Mackie; p. cm.; Includes bibliographical references and index. ISBN 0–8371–985–9; 1. Mackie, Gerry L. II. Title.

*Expedited Articles*; Localizing Antithrombotic and Vasodilatory Activity with a Novel, Utrafast Nitric Oxide Donor; Joseph E. Saavedra, Garry J. Southan, Keith M. Davies, Anders Lundell, Chris Markou, Stephen R. Hanson, Christophe Adrie, William E. Hurford, Warren M. Zapol, and Larry K. Keefer; J. Med. Chem. 1996, 39, 4361–4365.

Nitric Oxide–Releasing Polymers Containing the [N(O)NO]– Group; Daniel J. Smith, Debashish Chakravarthy, Sharon Putfer, Maia L. Simmons, Joseph A. Hrabie, Michael L. Citro, Joseph E. Saavedra, Keith M. Davies, Thomas C. Hutsell, Daniel L. Mooradian, Stephen R. Hanson, and Larry K. Keefer; J. Med. Chem. 1996, 39, 1148–1156.

* cited by examiner

*Primary Examiner*—Peter Szekely
(74) *Attorney, Agent, or Firm*—Dierker & Glassmeyer

(57) ABSTRACT

A method of preventing fouling organisms in marine environments comprises the step of introducing into the marine environment in a predetermined form and in a sufficient amount an antifouling composition having as its effective ingredient a nitric oxide-releasing functional group of the diazeniumdiolate structure:

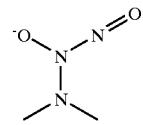

whereupon nitric oxide is controllably released into the marine environment to prevent at least one of the fouling organisms' propagation, ability to attach, and ability to function.

An antifouling composition consists essentially of an antifouling-acceptable carrier and a coprecipitation product of polylactide/glycolide and diethylenetriamine having the formula $H_3N^+CH_2CH_2N(N_2O_2)^{-1}CH_2CH_2NH_2$, wherein diethylenetriamine contains a nitric oxide-releasing functional group.

20 Claims, No Drawings

METHOD OF PREVENTING FOULING ORGANISMS IN MARINE ENVIRONMENTS AND POLYMER-BOUND NITRIC OXIDE/NITRIC OXIDE-RELEASING COMPOSITIONS USABLE THEREFOR

BACKGROUND OF THE INVENTION

The present invention relates generally to a process and product for preventing fouling organisms in marine environments, and more particularly to such a process and product which uses polymer-bound nitric oxide/nitric oxide-releasing compositions.

Marine fouling on ships, marine and sessile structures has been a problem for countless years. Shells and algae such as barnacles, oysters, mussels, hydroids, tube worms, bryozoans, tunicates, sea weeds and the like settle to and propagate on untreated: ship hulls, fishing nets, in-sea-water facilities (e.g. buoys), in-water structures (e.g. part of dam facilities), feed pipes for cooling water for condensers used in steam power plants or for heat exchangers used in petrochemical plants, etc. (these parts and facilities are in constant contact with water), fishing nets for cultivation or for fixed net fishing, etc. These fouling organisms invite increased resistance of water supply and reduced thermal conductivity, and bring about disadvantages such as reduced function of the facility and the like. In fishing nets, the settlement of the above-mentioned organisms causes stopping-up of meshes, and resultant oxygen shortage, scratching of fish (this reduces the commercial value of fish), and infection of fish with diseases caused by microbes, etc.

Thus, there has been a need to prevent fouling organisms, namely to prevent settlement and propagation of such seawater or pure water fouling organisms to and on ship hulls, fishing nets, in-sea-water facilities (e.g. buoys), in-water structures (e.g. part of dam facilities), feed pipes for cooling water for condensers used in steam power plants or for heat exchangers used in petrochemical plants, etc. A specific fouling organism gaining attention in more recent years has been the zebra mussel.

The marine fouling problem has been recently addressed primarily by the use of certain coatings containing biocides that are toxic to marine organisms. These conventional coatings leached biocides out of the coating when in seawater.

Self-polishing antifouling coatings have been used. These coatings are based on polymers of tributyltin methacrylate, methyl methacrylate, and film softening monomers such as 2-ethylhexyl acrylate. An organotin polymer acts as the paint binder. All such paints also contain a toxicant additive such as cuprous oxide or a triorganotin compound. In addition, the usual paint additives such as pigments, thixotropic agents, etc. may also be present. In normally alkaline seawater, the polymeric organotin binder is gradually hydrolyzed, and the tributyltin is liberated in a form that is an active antifoulant. The hydrolyzed polymer formed is water-soluble or water-swellable and is easily eroded off the surface by moving seawater, exposing a fresh surface of paint.

The major advantage of these systems is that, unlike leaching paints, toxicant release is linear with time, and all of the toxicant present is utilized over the lifetime of the paint. Furthermore, there is no need to remove the residues of an old self-polishing paint system prior to repainting, since the composition of the residue is essentially the same as it was when originally applied, unlike conventional antifouling paints which leave a weak, leached-out matrix of binder on the ships' hull at the end of their lifetime. An additional advantage claimed for such systems is a reduction in hull surface roughness with time as a consequence of erosion of the paint film. This roughness reduction translates to fuel savings for the ship operator.

Sea-going vessels usually have between 2 and 4 coats of antifouling paint, each coat of 100 microns film thickness, applied to the hull. This coating, of 200 to 400 microns total film thickness, is expected to last for about five years.

A marine antifoulant coating should preferably meet some criteria in order to be commercially acceptable, such as the following. The polymer should be preferably soluble in a paint media for easy application. The polymer solution should preferably have good film-forming properties. The film coating preferably should have good adhesion to the ship's surface and be flexible; and the film preferably should undergo hydrolysis only at the coating surface. This permits the controlled release of the metal. The remaining paint surface becomes susceptible to the moving seawater and is eroded. This mechanism is known as "self-polishing," and a marked improvement in the ship's fuel efficiency is observed. The polymer preferably should also have controlled release characteristics.

U.S. Pat. No. 5,637,745 issued to Silverman et al. discloses various organometallic compounds and polymers made therefrom for antifouling purposes; which patent is incorporated herein by reference in its entirety.

Although antifouling agents containing an organotin compound as described above have been effective, there has recently arisen substantial social concern that the organotin compounds themselves are polluting rivers, lakes, oceans and the like; and further, that the organotin compounds cause harm to human bodies via fish. Hence, a regulation has been established regarding the use of organotin compounds, and the use and production of organotin compounds are under mandatory control.

Meanwhile, organic compounds other than organotin compounds have been studied as antifouling agents. For example, the compound capsaicin (a colorless irritant phenolic amide found in hot peppers), has shown some promise as an antifouling agent. However, preventative agents for fouling organisms containing conventional organic compounds have not provided antifouling properties as effective as desired. U.S. Pat. No. 5,603,755 issued to Okada et al. discloses various non-organotin compounds for antifouling purposes; which patent is incorporated herein by reference in its entirety.

Thus, it is an object of the present invention to provide a process and product for preventing fouling organisms in marine environments. It is a further object of the present invention to provide a preventative agent for fouling organisms, containing as an effective ingredient an organic compound other than organotin compounds, which preventative agent advantageously is acceptably safe for the environment and humans, and exhibits a relatively high antifouling effect at a relatively low dosage. Yet further, it is an object of the present invention to provide such a preventative agent which may be used in combination with known and commonly used toxins such as organotin compounds, thereby advantageously rendering the toxins more effective at lower concentrations, thus minimizing any environmental harm caused by the toxins.

SUMMARY OF THE INVENTION

The present invention addresses and solves the problems/ drawbacks enumerated above, and encompasses other features and advantages as well. The present invention comprises a method of preventing fouling organisms in marine environments. The method comprises the step of introducing into the marine environment in a predetermined form and in a sufficient amount an antifouling composition having as its effective ingredient a nitric oxide-releasing functional group of the diazeniumdiolate structure:

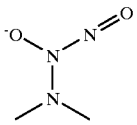

whereupon nitric oxide is controllably released into the marine environment to prevent at least one of the fouling organisms' propagation, ability to attach, and ability to function.

An antifouling composition according to the present invention consists essentially of an antifouling-acceptable carrier and a coprecipitation product of a polymer selected from the group consisting of polyolefins, polyethers, polyesters, polyamides, polyurethanes, peptides, and starburst dendrimers, and an organic compound containing the nitric oxide-releasing functional group. The nitric oxide-releasing functional group may be of the formula:

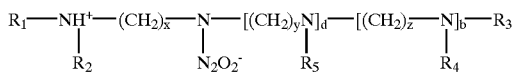

wherein b and d are the same or different and may be zero or one; $R_1$, $R_2$, $R_3$, $R_4$ and $R_5$ are the same or different and may be hydrogen, $C_{3-8}$ cycloalkyl, $C_{1-12}$ straight or branched chain alkyl, benzyl, benzoyl, phthaloyl, acetyl, trifluoroacetyl, p-toluyl, t-butoxycarbonyl, or 2,2,2-trichloro-6-butoxycarbonyl; and x, y, and z are the same or different and are integers from 2 to 12.

DETAILED DESCRIPTION OF THE PREFERRED EMBODIMENTS

The present invention is predicated upon the heretofore unrecognized and unappreciated utility of polymer-bound nitric oxide/nitric oxide-releasing compositions for use as antifouling agents. The present antifouling method and agents of the present invention are useful against the fouling organisms mentioned hereinabove, as well as others not mentioned. It is to be understood that the present invention is useful in any marine environment; and "marine" as used herein is contemplated to include any fresh or salt water environment including, but not limited to rivers, oceans and lakes.

Although nitric oxide (NO) has been implicated in a variety of bioregulatory processes, including normal physiological control of blood pressure, macrophage-induced cytostasis and cytotoxicity, and neurotransmission, it has not heretofore been implicated for use as or with an antifouling agent.

A number of compounds have been developed which are capable of delivering nitric oxide, including compounds which release nitric oxide upon being metabolized and compounds which release nitric oxide spontaneously in aqueous solution. Those compounds which release nitric oxide upon being metabolized include the widely used nitrovasodilators glyceryl trinitrate and sodium nitroprusside. Commonly used chemical nitro-vasodilators, such as nitroglycerin and nitroprusside, appear to act by releasing NO. Another compound, S-nitroso-N-acetylpenicillamine, has been reported to release nitric oxide in solution and to be effective at inhibiting DNA synthesis.

Endothelium-derived relaxing factor (EDRF) is a labile humoral agent which is part of a cascade of interacting agents involved in the relaxation of vascular smooth muscle. EDRF is thus important in the control of vascular resistance to blood flow and in the control of blood pressure. Some vasodilators act by causing EDRF to be released from endothelial cells. EDRF has been shown to be nitric oxide (NO) or a compound with a nitric oxide moiety. Evidence that nitric oxide is released from the endothelial cells and is responsible for the relaxation of the vascular smooth muscle, and hence the control of blood pressure, has resulted in the development of artificial agents that can deliver nitric oxide in vivo. A very important class of such agents is the nitric oxide-nucleophile complexes. Recently, a method for treating cardiovascular disorders in a mammal with certain nitric oxide nucleophile complexes has been disclosed, e.g. in U.S. Pat. No. 4,954,526. These compounds contain the anionic $N_2O_2^-$ group or derivatives thereof.

A nitric oxide/nucleophile adduct has been disclosed whose action can be localized to enhance the selectivity of nitric oxide release; whose release of nitric oxide can be controlled to effect efficient dosing for a prolonged biological effect; and which are capable of releasing nitric oxide wherein the nitric oxide/nucleophile adduct is associated with a polymer. See, for example, U.S. Pat. No. 5,718,892 issued to Keefer et al., which is incorporated herein by reference in its entirety. See also "Nitric Oxide-Releasing Polymers Containing the [N(O)NO]⁻ Group," Smith, Daniel J. et al., *J. Med. chem.* 1996, 39, 1148–56, published by the American Chemical Society, which is also incorporated herein by reference in its entirety.

NO is synthesized by the oxidative deamination of a guanidino nitrogen of L-arginine by at least three different isoforms of a flavin-containing enzyme, nitric oxide synthase (NOS). Three distinct isoforms have been purified, cloned and expressed, and there is evidence for the presence of NOS in almost every tissue of the mammalian body, albeit at widely different levels. NO appears to be an ideal local transcellular messenger because of its small size, lipophilic nature, and short duration of action.

Further biological effects of nitric oxide have been disclosed in U.S. Pat. No. 5,698,738 issued to Garfield et al., which is incorporated herein by reference in its entirety. Garfield et al. disclose further molecules with NONOate functionality, and teach that nitric oxide elevates levels of cGMP (1,3,5-cyclic guanosine monophosphate) within vascular smooth muscle to produce relaxation and reduce the tone on blood vessels. Nitric oxide binds to heme and thus activates soluble guanylate cyclase to increase cellular content of cGMP. It has long been recognized that nitrovasodilators, such as nitroprusside and nitroglycerin, inhibit vascular smooth muscle contractility to produce relaxation or reduce vascular tone. These agents have been used since the late 1800's as vasodilators. However, it has only been recently that the mechanism of action of these compounds has been realized. Nitrovasodilators are now classified as nitric oxide donors. The long-used nitrovasodilators may be regarded as substitution therapy for a failing physiological mechanism. Stimulated macrophages produce nitric oxide from L-arginine, and it is considered the first line of defense against invading pathogens.

As can be seen from the above, nitric oxide has been proven to be a ubiquitous molecule in animal systems functioning as vasodilator (EDRF), neurotransmitter, and muscle relaxant. It is an extremely bioactive molecule at very low concentrations. In non-mammalian systems, it is hypothesized that invertebrates such as mussels and oysters produce NO as a defense mechanism against infectious microorganisms, see Ottaviani, Enzo et al., "Evidence for nitric oxide production and utilization as a bacteriocidal agent by invertebrate immunocytes," *European Journal of Pharmacology—Environmental Toxicology and Pharmacology Section* 248 (1993) pp. 319–324; and Roch, Philippe, "Defense mechanisms and disease prevention in farmed marine invertebrates,"*Aquaculture* 172 (1999) pp. 125–145. Further, nitric oxide synthase activity has been demonstrated by molluscan hemocytes, see Conte, Angela et al., "Nitric oxide synthase activity in molluscan hemocytes," *FEBS Letters* 365 (1995) pp. 120–124.

However, it has unexpectedly been discovered herein that NO may be useful as an antifouling agent. For example, without being bound to any theory, it is believed that NO may relax the byssal threads in Zebra Mussels, thus preventing the organism from attaching. It is further believed that, in several fouling organisms, nitric oxide may relax the intake channels, thus disabling the organism. In conjunction with a known and commonly used toxin such as organotin compounds, the NO may render the toxin(s) more effective at lower concentrations.

Without being bound to any theory, it is further believed that, as a neurotransmitter, the NO may affect the organism's ability to attach and/or reproduce. Further, the NO may react with local molecules to cause an antifouling effect. It is to be understood that, because nitric oxide is a highly active molecule, it may also serve a mode of antifouling not mentioned above, which mode is contemplated as being within the scope of the present disclosure.

It is to be understood that the polymer-bound nitric oxide/nitric oxide-releasing compositions can be used as and/or incorporated into a paint, coating, solution, emulsion, pellets, powder, flakes, and the like for use as an antifouling agent.

The present invention provides an antifouling agent including a composition capable of releasing nitric oxide which includes a nitric oxide-releasing $N_2O_2^-$ functional group bound to a polymer. By "bound to a polymer," it is meant that the $N_2O_2^-$ functional group is associated with, part of, incorporated with or contained within the polymer matrix physically or chemically. Physical association or bonding of the $N_2O_2^-$ functional group to the polymer may be achieved by coprecipitation of the polymer with a nitric oxide/nucleophile complex as well as by covalent bonding of the $N_2O_2^-$ group to the polymer. Chemical bonding of the $N_2O_2^-$ functional group to the polymer may be by, for example, covalent bonding of the nucleophile moiety of the nitric oxide/nucleophile adduct to the polymer such that the nucleophile residue to which the $N_2O_2^-$ group is attached forms part of the polymer itself, i.e., is in the polymer backbone or is attached to pendant groups on the polymer backbone. The manner in which the nitric oxide-releasing $N_2O_2^-$ functional group is associated, part of, or incorporated with or contained within, i.e., "bound," to the polymer is inconsequential to the present invention and all means of association, incorporation and bonding are contemplated herein.

The present invention is predicated on the discovery that useful antifouling agents can be provided by incorporating nitric oxide-releasing $N_2O_2^-$ functional groups into a polymeric matrix. Accordingly, the $N_2O_2^-$ functional group is "bound to the polymer" as that term has been defined herein. It has been discovered that incorporation of the $N_2O_2^-$ functional group into a polymeric matrix provides a polymer-bound nitric oxide/nucleophile adduct composition that can be applied with specificity to an antifouling site of interest.

Additionally, incorporation of the $N_2O_2^-$ functional group into a polymer matrix can reduce the propensity of the nitric oxide/nucleophile adduct for the relatively rapid release of nitric oxide. This prolongs the release of nitric oxide by the $N_2O_2^-$ functional group, and allows for efficient application/use to achieve a desired antifouling effect so the frequency of application/use can be reduced.

A composition for inhibiting the growth of fouling organisms on structures in contact with water has as its effective component a compound of the general diazeniumdiolate structure:

NONOate=1-substituted diazen-1-ium-1,2-diolate

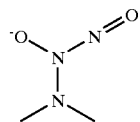

This general structure may be incorporated into a polymer as described by Smith, Daniel J. et al., supra. In the preferred embodiment, the nitric oxide releasing compound may take any of the forms described below.

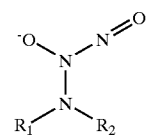

wherein $R_1$ and $R_2$ are independently selected from the group consisting of alkyl chains of 1–20 carbons.

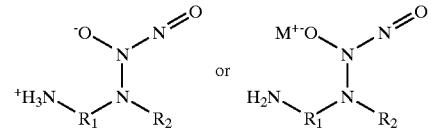

wherein $R_1$ and $R_2$ are independently selected from the group consisting of alkyl chains of 1–20 carbons with an amine group on the terminus of one chain existing as a zwitterion; or wherein $R_1$ and $R_2$ are independently selected from the group consisting of alkyl chains of 1–20 carbons with an amine group on the terminus and a group I counter ion; and $M^+$ is preferably an alkali metal cation (most preferably sodium or potassium) although other antifouling acceptable cations may be used. Such cations are selected from the group consisting of calcium, magnesium, ammonium or ammonium substituted with lower alkyl (C1–C4), cycloalkyl (5- or 6-membered), benzyl or phenyl or naphthyl.

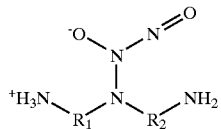

wherein $R_1$ and $R_2$ are independently selected from the group consisting of alkyl chains of 1–20 carbons with amine groups on the termini of both chains existing as a zwitterion.

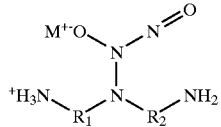

wherein $R_1$ and $R_2$ are independently selected from the group consisting of alkyl chains of 1–20 carbons with amine groups on the termini of both chains and a group I counter ion; and $M^+$ is preferably an alkali metal cation (most preferably sodium or potassium) although other antifouling acceptable cations may be used. Such cations are selected from the group consisting of calcium, magnesium, ammonium or ammonium substituted with lower alkyl (C1–C4), cycloalkyl (5- or 6-membered), benzyl or phenyl or naphthyl.

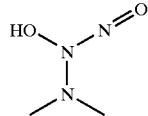

wherein $R_1$ and $R_2$ are independently selected from the group consisting of alkyl chains of 1–20 carbons with a nitrogen substituent or multiple nitrogen substituents within one or both of the chains and/or one or several degrees of unsaturation within one or both of the chains.

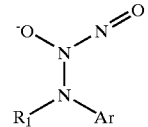

wherein $R_1$ is an alkyl chain of 1–20 carbons; and Ar is selected from the group consisting of phenyl groups, and mono, di, tri, or tetra halogenated phenyl groups.

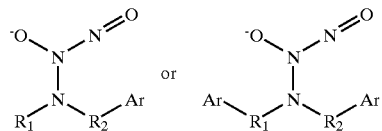

wherein $R_1$ and $R_2$ are independently selected from the group consisting of alkyl chains of 1–20 carbons; and Ar is selected from the group consisting of phenyl groups, and mono, di, tri, or tetra halogenated phenyl groups.

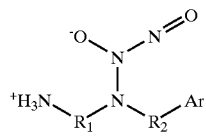

wherein $R_1$ and $R_2$ are independently selected from the group consisting of alkyl chains of 1–20 carbons with an amine group on the terminus of one chain; and Ar is selected from the group consisting of phenyl groups, and mono, di, tri, or tetra halogenated phenyl groups.

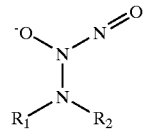

wherein $R_1$ and $R_2$ are independently selected from the group consisting of alkyl chains of 1–20 carbons with a nitrogen substituent or multiple nitrogen substituents within one or both of the chains and with or without degrees of unsaturation within one or both of the chains.

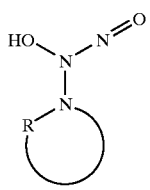

wherein R forms a heterocycle at the adjacent nitrogen of the diazanitroso group. The heterocycle may be of any ring size and include one or more of any of the following combinations: degrees of unsaturation, nitrogen groups, carbonyl groups, or aryl groups, aryl groups selected from the group consisting of phenyl groups, and mono, di, tri, or tetra halogenated phenyl groups.

In the preferred embodiment, the antifouling composition comprises an antifouling-acceptable carrier and a coprecipitation product of a polymer selected from the group consisting of polyolefins, polyethers, polyesters, polyamides, polyurethanes, peptides, and starburst dendrimers, and an organic compound containing a nitric oxide-releasing functional group. It is preferred that the polymer be a polylactide/glycolide; and that the organic compound be diethylenetriamine having the formula $H_3N^+CH_2CH_2N(N_2O_2)^-CH_2CH_2NH_2$.

In an alternate preferred embodiment, the antifouling composition comprises an antifouling-acceptable carrier and a polymer capable of releasing nitric oxide, the polymer comprising a polymeric backbone, wherein the polymeric backbone is of a polymer selected from the group consisting of polyolefins, polyethers, polyesters, polyamides, polyurethanes, peptides, and starburst dendrimers, and at least one nitric oxide-releasing functional group selected from the group consisting of X— and —X, wherein X is an amine-group containing organic moiety covalently bonded to the polymer, and wherein the group is covalently bonded in the polymer through the amine-group containing organic moiety X.

In either of the above embodiments, the nitric oxide-releasing functional group may be of the formula:

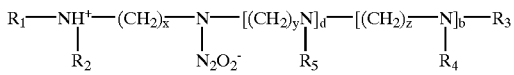

wherein b and d are the same or different and may be zero or one; $R_1$, $R_2$, $R_3$, $R_4$ and $R_5$ are the same or different and may be hydrogen, $C_{3-8}$ cycloalkyl, $C_{1-12}$ straight or branched chain alkyl, benzyl, benzoyl, phthaloyl, acetyl, trifluoroacetyl, p-toluyl, t-butoxycarbonyl, or 2,2,2-trichloro-6-butoxycarbonyl; and x, y, and z are the same or different and are integers from 2 to 12.

In a further alternate preferred embodiment, the nitric oxide-releasing functional group may be of the formula:

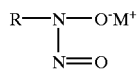

wherein R is 2-methoxyphenyl; and M is an alkali metal, an alkaline-earth metal, an ammonium or substituted ammonium cation.

To further illustrate the composition, the following examples are given. It is to be understood that these examples are provided for illustrative purposes and are not to be construed as limiting the scope of the present invention.

EXAMPLE 1

A rectangular stainless steel substrate, not treated with any antifouling agents, is placed into Lake St. Clair, Mich. two weeks before the zebra mussel breeding season, in an area prone to mussel infestation. A biofilm forms on the substrate before breeding occurs. After 4 months, the substrate has an estimated settlement intensity of 21,812 mussels/$m^2$ (mean number), determinable by methods described in Claudi, Renata and Gerald L. Mackie, *Zebra Mussel Monitoring and Control,* Chapter 2: "Monitoring for Zebra Mussel Infestation," pp. 59–81 (1994).

EXAMPLE 2

An antifouling agent is prepared according to the following. NONOate is grafted onto a polysaccharide (dextran) using cyanogen bromide as the coupling agent. The dextran is cross-linked during the process through formation of the potentially biodegradable imidocarbonate linkage in an oil-in-water microsphere preparative technique. The polymeric spheres are exposed to NO to give a free flowing white powder.

The white powder is incorporated into a paint suitable for applying to ship hulls, thereby producing an antifouling paint. The rectangular stainless steel substrate of Example 1 is thoroughly cleaned and is then coated with 1 coat of the antifouling paint, having a film thickness of about 100 microns. The rectangular stainless steel substrate is then placed into Lake St. Clair, Mich. two weeks before the zebra mussel breeding season, in an area prone to mussel infestation. A biofilm forms on the substrate before breeding occurs. After 4 months, the substrate has a significantly lower estimated settlement intensity of mussels/$m^2$ (mean number).

Zebra mussels in the near vicinity of the substrate are removed from the water and examined. It is determined that the zebra mussels' byssal threads are relaxed to such a state that the mussels cannot attach to any objects.

The lake water proximate to the substrate is tested to determine any level of toxins or other compounds potentially unsafe for marine or human life. Nitrates and nitrites, considered harmless, are found. It is determined that the NONOate carrier molecule does not leach out of the polymer.

EXAMPLE 3

A simulated salt water environment is prepared. Fouling organisms are introduced into the salt water environment. A scaled down boat dock, not treated with any antifouling agents, is placed into the simulated salt water environment. After 4 months, the boat dock has an unacceptably high estimated settlement intensity of fouling organisms/$m^2$ (mean number).

EXAMPLE 4

An antifouling agent is prepared according to Example 2. The white powder is incorporated into a replaceable ring suitable for attachment to docks, thereby producing an antifouling ring useful for sessile structures. The boat dock of Example 3 is thoroughly cleaned and the ring is then placed about the dock. The boat dock is then placed back into the simulated salt water environment of Example 3 having fouling organisms in it. After 4 months, the dock shows a significantly lower estimated settlement intensity of fouling organisms/$m^2$ (mean number).

Fouling organisms in the near vicinity of the dock are examined. It is determined that the fouling organisms' intake channels are relaxed to such a state that the organisms are substantially disabled. Further, it is determined that the organisms have been affected to such an extent as to substantially prevent them from reproducing.

The simulated salt water environment is tested to determine any level of toxins or other compounds potentially unsafe for marine or human life. Nitrates and nitrites, considered harmless, are found. It is determined that the NONOate carrier molecule does not leach out of the polymer.

EXAMPLE 5

The antifouling paint of Example 2 has incorporated thereinto a toxin having organotin as its effective ingredient. The amount of the toxin used is less than that generally used in conventional organotin based antifouling paints. The substrate of Example 1 is thoroughly cleaned and is then coated with 1 coat of the antifouling paint containing the organotin component, having a film thickness of about 100 microns. The rectangular stainless steel substrate is then placed into Lake St. Clair, Mich. two weeks before the zebra mussel breeding season, in an area prone to mussel infestation. A biofilm forms on the substrate before breeding occurs. After 4 months, the substrate has a lower estimated settlement intensity of mussels/$m^2$ (mean number) than in Example 2.

Zebra mussels in the near vicinity of the substrate are removed from the water and examined. It is determined that the zebra mussels' byssal threads are relaxed to such a state that the mussels cannot attach to any objects and/or are poisoned to the point of being disabled or dead.

The advantages of the present invention include, but are not limited to the following. The compositions can be used as and/or incorporated into a paint, coating, solution, emulsion, pellets, powder, flakes, and the like for use as an antifouling measure. The compositions of the present invention may contain as an effective ingredient an organic compound other than organotin compounds (eg. phenolic amides), thereby having higher safety and exhibiting a relatively high antifouling effect at a relatively low amount. In addition, it is believed that the compositions of the present invention containing NO via a polymer-bound NO/nucleophile adduct may increase the effectiveness of anti-fouling toxins (e.g. organotin compounds), thereby minimizing (the amount of toxin needed, and thus) the adverse effects of the toxins.

Further, a nitric oxide releaser with a NONOate functionality can advantageously be made in large quantity. In addition, nitric oxide is likely to show effects at very low concentrations. The carrier molecule of a NONOate group may be desirably altered to adjust stability and its ability to be incorporated into a polymer. Since a NONOate group releases nitric oxide in a pH dependent manner (first order kinetics), the polymer may release NO based on local conditions (eg. barnacle attachment).

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A method of preventing fouling organisms in marine environments, comprising the step of:

introducing into the marine environment in a sufficient amount an antifouling composition, wherein the antifouling composition is used as and/or incorporated into at least one of paints, coatings, solutions, emulsions, pellets, powders, and flakes, the antifouling composition having as its effective ingredient a nitric oxide-releasing functional group whereupon nitric oxide is controllably released into the marine environment to prevent at least one of the fouling organisms' propagation, ability to attach, and ability to function;

wherein the nitric oxide-releasing functional group is of the formula:

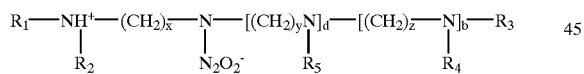

wherein b and d are the same or different and may be zero or one; $R_1$, $R_2$, $R_3$, $R_4$ and $R_5$ are the same or different and may be hydrogen, $C_{3-8}$ cycloalkyl, $C_{1-12}$ straight or branched chain alkyl, benzyl, benzoyl, phthaloyl, acetyl, trifluoroacetyl, p-toluyl, t-butoxycarbonyl, or 2,2,2-trichloro-6-butoxycarbonyl; and x, y, and z are the same or different and are integers from 2 to 12.

2. The method as defined in claim 1 wherein the antifouling composition consists essentially of an antifouling-acceptable carrier and a coprecipitation product of a polymer selected from the group consisting of polyolefins, polyethers, polyesters, polyamides, polyurethanes, peptides, and starburst dendrimers, and an organic compound containing the nitric oxide-releasing functional group.

3. The method as defined in claim 2 wherein the polymer is a polylactide/glycolide; and the organic compound is diethylenetriamine having the formula $H_3N^+CH_2CH_2N(N_2O_2)^-CH_2CH_2NH_2$.

4. The method as defined in claim 1 wherein the antifouling composition comprises an antifouling-acceptable carrier and a polymer capable of releasing nitric oxide, the polymer comprising a polymeric backbone, wherein the polymeric backbone is of a polymer selected from the group consisting of polyolefins, polyethers, polyesters, polyamides, polyurethanes, peptides, and starburst dendrimers, wherein the nitric oxide-releasing functional group contains X—, wherein X is an amine-group containing organic moiety covalently bonded to the polymer, and wherein the group is covalently bonded in the polymer through the amine-group containing organic moiety X—.

5. The method of claim 1 wherein the antifouling composition is incorporated into a paint useable for ship hulls; and wherein the amount is at least one coating having a film thickness of about 100 microns.

6. The method of claim 1 wherein an antifouling agent is incorporated into the antifouling composition in an amount sufficient to be effectively harmful to fouling organisms, while yet being environmentally acceptable in the marine environments.

7. A method of preventing fouling organisms in marine environments, comprising the step of:

introducing into the marine environment in a sufficient amount an antifouling composition, wherein the antifouling composition is used as and/or incorporated into at least one of paints, coatings, solutions, emulsions, pellets, powders, and flakes, the antifouling composition consisting essentially of an antifouling-acceptable carrier and a coprecipitation product of polylactide/glycolide and diethylenetriamine having the formula $H_3N^+CH_2CH_2N(N_2O_2)^-CH_2CH_2NH_2$, wherein diethylenetriamine contains a nitric oxide-releasing functional group;

wherein the nitric oxide-releasing functional group is of the formula:

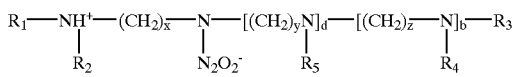

wherein b and d are the same or different and may be zero or one; $R_1$, $R_2$, $R_3$, $R_4$ and $R_5$ are the same or different and may be hydrogen, $C_{3-8}$ cycloalkyl, $C_{1-12}$ straight or branched chain alkyl, benzyl, benzoyl, phthaloyl, acetyl, trifluoroacetyl, p-toluyl, t-butoxycarbonyl, or 2,2,2-trichloro-6butoxycarbonyl; and x, y, and z are the same or different and are integers from 2 to 12.

8. The method of claim 7 wherein the antifouling composition is incorporated into a paint useable for ship hulls; and wherein the amount is at least one coating having a film thickness of about 100 microns.

9. The method of claim 7 wherein an antifouling agent including an organotin toxin is incorporated into the antifouling composition in an amount sufficient to be effectively harmful to fouling organisms, while yet being environmentally acceptable in the marine environments.

10. An antifouling composition for preventing fouling organisms in marine environments, the composition having as its effective ingredient a nitric oxide-releasing functional group whereupon nitric oxide is controllably released into the marine environment to prevent at least one of the fouling organisms' propagation, ability to attach, and ability to function;

wherein the nitric oxide-releasing functional group is of the formula:

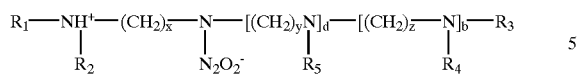

wherein b and d are the same or different and may be zero or one; $R_1$, $R_2$, $R_3$, $R_4$ and $R_5$ are the same or different and may be hydrogen, $C_{3-8}$ cycloalkyl, $C_{1-12}$ straight or branched chain alkyl, benzyl, benzoyl, phthaloyl, acetyl, trifluoroacetyl, p-toluyl, t-butoxycarbonyl, or 2,2,2-trichloro-6-butoxycarbonyl; and x, y, and z are the same or different and are integers from 2 to 12.

11. The composition as defined in claim 10 wherein the antifouling composition consists essentially of an antifouling-acceptable carrier and a coprecipitation product of a polymer selected from the group consisting of polyolefins, polyethers, polyesters, polyamides, polyurethanes, peptides, and starburst dendrimers, and an organic compound containing the nitric oxide-releasing functional group.

12. The composition as defined in claim 10 wherein the polymer is a polylactide/glycolide; and the organic compound is diethylenetriamine having the formula $H_3N^+CH_2CH_2N(N_2O_2)^-CH_2CH_2NH_2$.

13. The composition as defined in claim 10 wherein the antifouling composition comprises an antifouling-acceptable carrier and a polymer capable of releasing nitric oxide, the polymer comprising a polymeric backbone, wherein the polymeric backbone is of a polymer selected from the group consisting of polyolefins, polyethers, polyesters, polyamides, polyurethanes, peptides, and starburst dendrimers, wherein the nitric oxide-releasing functional group contains X—, wherein X is an amine-group containing organic moiety covalently bonded to the polymer, and wherein the group is covalently bonded in the polymer through the amine-group containing organic moiety X—.

14. The composition of claim 10 wherein the antifouling composition is incorporated into a paint useable for ship hulls.

15. The composition of claim 10 wherein an antifouling agent including an organotin toxin is incorporated into the antifouling composition in an amount sufficient to be effectively harmful to fouling organisms, while yet being environmentally acceptable in the marine environments.

16. The method as defined in claim 1 wherein the nitric oxide-releasing functional group is of the diazeniumdiolate structure:

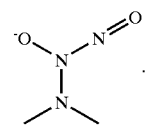

17. The method as defined in claim 1 wherein the nitric oxide-releasing functional group is alternately of the formula:

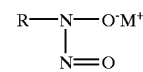

wherein R is 2-methoxyphenyl; and M is an alkali metal, an alkaline-earth metal, an ammonium or substituted ammonium cation.

18. The method as defined in claim 7 wherein the nitric oxide-releasing functional group is alternately of the formula:

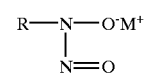

wherein R is 2-methoxyphenyl; and M is an alkali metal, an alkaline-earth metal, an ammonium or substituted ammonium cation.

19. The antifouling composition as defined in claim 10 wherein the nitric oxide-releasing functional group is of the diazeniumdiolate structure:

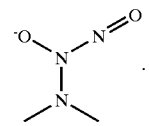

20. The antifouling composition as defined in claim 10 wherein the nitric oxide-releasing functional group is alternately of the formula:

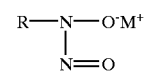

wherein R is 2-methoxyphenyl, and M is an alkali metal, an alkaline-earth metal, an ammonium or substituted ammonium cation.

* * * * *